US010405475B2

(12) United States Patent
Goda et al.

(10) Patent No.: US 10,405,475 B2
(45) Date of Patent: Sep. 10, 2019

(54) HITCH MOUNT AND SUPPORT FOR SPRAYER BOOM

(71) Applicant: Green Leaf, Inc., Fontanet, IN (US)

(72) Inventors: Pete Goda, Terre Haute, IN (US); Greg Mansfield, West Terre Haute, IN (US)

(73) Assignee: Green Leaf, Inc., Fontanet, IN (US)

( * ) Notice: Subject to any disclaimer, the term of this patent is extended or adjusted under 35 U.S.C. 154(b) by 120 days.

(21) Appl. No.: 15/820,920

(22) Filed: Nov. 22, 2017

(65) Prior Publication Data
US 2019/0150349 A1    May 23, 2019

(51) Int. Cl.
| | |
|---|---|
| *A01B 59/06* | (2006.01) |
| *A01C 23/04* | (2006.01) |
| *B60R 9/06* | (2006.01) |
| *B05B 9/04* | (2006.01) |
| *B05B 1/20* | (2006.01) |
| *B05B 9/00* | (2006.01) |
| *A01B 59/00* | (2006.01) |

(52) U.S. Cl.
CPC ............ *A01B 59/06* (2013.01); *A01B 59/002* (2013.01); *A01C 23/047* (2013.01); *B05B 1/20* (2013.01); *B05B 9/007* (2013.01); *B05B 9/04* (2013.01); *B60R 9/06* (2013.01)

(58) Field of Classification Search
CPC ..... A01B 59/06; A01B 59/002; A01C 23/047; B05B 1/20; B05B 9/007; B05B 9/04; B60R 9/06

USPC .......................... 239/164, 165, 166, 159, 172
See application file for complete search history.

(56) References Cited

U.S. PATENT DOCUMENTS

| | | | |
|---|---|---|---|
| 3,055,594 A | 9/1962 | Nansel | |
| 4,643,358 A * | 2/1987 | Jackson | A01M 7/0075 239/166 |
| 4,784,324 A * | 11/1988 | DeWitt | B05B 15/68 239/165 |
| 5,375,767 A * | 12/1994 | Thorstensson | A01M 7/0053 239/164 |
| 5,423,394 A | 6/1995 | Kendle | |
| 5,957,383 A | 9/1999 | Benest | |
| 6,010,080 A | 1/2000 | Msarchand et al. | |
| 6,138,770 A | 10/2000 | Kayser | |
| 6,502,771 B1 | 1/2003 | Wyne | |
| 6,869,025 B2 | 3/2005 | Guesdon | |
| 8,016,539 B1 | 9/2011 | Potter et al. | |
| 8,899,610 B2 | 12/2014 | Venn | |

\* cited by examiner

*Primary Examiner* — Steven J Ganey
(74) *Attorney, Agent, or Firm* — Woodward, Emhardt, Henry, Reeves & Wagner, LLP; Charles Meyer

(57) ABSTRACT

In certain aspects the present disclosure provides lawn/garden spraying devices and methods for their use. The support arrangement is configured to be mounted to a trailer hitch of a lawn and garden tractor, ATV or UTV. The support enables the user to selectively fix the height and angle of the nozzles on a spray boom. The support forms an adjustable "Z" arrangement.

20 Claims, 4 Drawing Sheets

HITCH MOUNT AND SUPPORT FOR SPRAYER BOOM

BACKGROUND

Spraying of lawn/garden liquids, such as pesticides, herbicides, and fertilizers is a well-established technique for dispensing such liquids over large or small target areas. Spraying allows for generally uniform coverage of the dispensed liquid over a target area while limiting waste or run-off. Many lawn and garden spray systems include pressurized fluid flow to dispersal components such as booms or hand held wands for dispensing of lawn/garden liquids. In some arrangements, a spray boom is mounted to a support vehicle, for instance on a lawn and garden tractor, on an all terrain vehicle ("ATV") or on a utility vehicle ("UTV"). The arrangement supports a boom with nozzles which can be used to dispense liquid onto the lawn or garden. The nozzles are typically arranged in a fixed position on the boom and are not adjustable in direction. Further, the boom may have little, if any, adjustability in height or angle.

The optimal height and angle of nozzles on a spray boom may vary depending on the circumstances. For example, liquids of different viscosities may spray in different manners. The optimal nozzle height and angle may also depend on the desired coverage density and spray pattern for the liquid. When the boom and nozzles are not adjustable, the liquid may be applied in a non-optimal manner.

SUMMARY

In certain aspects the present disclosure provides unique lawn/garden spraying devices and methods for their use which enable the user to selectively fix the height and angle of the nozzles on a spray boom. Certain embodiments are configured to be mounted to a trailer hitch of a lawn and garden tractor, ATV or UTV. The support is arranged in an adjustable "Z" arrangement.

A representative embodiment of a lawn/garden liquid spraying device includes a lower linkage member having a forward end and an opposing rearward end, with the forward end coupled to a vehicle. A central linkage member has a lower end and an opposing upward end, wherein the lower end is pivotally coupled to the rearward end of the lower linkage member forming an adjustable lower pivot joint. The lower pivot joint is selectively lockable to fix the angle of the central linkage member relative to the lower linkage member. An upper linkage member has a forward end and an opposing rearward end, with the forward end pivotally coupled to the upward end of the central linkage member forming an adjustable upper pivot joint. The upper pivot joint is selectively lockable to fix the angle of the upper linkage member relative to the central linkage member. A spray boom with nozzles is mounted to the rearward end of the upper linkage member, and a fluid reservoir is carried by the vehicle, wherein fluid in the reservoir is supplied under pressure to the spray boom and nozzles.

Certain embodiments provide a lawn/garden liquid spraying device having a lower linkage member having a forward end and an opposing rearward end, with the forward end configured to be coupled to a vehicle. The rearward end includes a pair of parallel lower joint plates arranged in a vertical orientation and defining a gap between them. A central linkage member has a lower end and an opposing upward end, wherein the lower end is pivotally coupled between the lower joint plates forming a lower pivot joint. The upward end includes a pair of parallel upper joint plates arranged in a vertical orientation and defining a gap between them. The lower pivot joint is selectively lockable to fix the angle of the central linkage member relative to the lower linkage member. An upper linkage member has a forward end and an opposing rearward end, wherein the forward end is coupled between the upper joint plates forming an upper pivot joint. The upper pivot joint is selectively lockable to fix the angle of the upper linkage member relative to the central linkage member. A spray boom with nozzles is mounted to the rearward end of the upper linkage member.

An illustrative method of using a lawn/garden liquid spraying device to a vehicle includes coupling a support for a spraying device onto a vehicle, wherein the support includes a lower linkage having a rearward end pivotally coupled to a lower end of a central linkage member, and a rearward end of a an upper linkage member pivotally coupled to an upper end of the central linage member. The method includes mounting a spray boom with nozzles to the rearward end of the upper linkage member. The user pivots the central linkage member to a selected angle relative to the lower linkage member and fixes the central linkage member at the desired angle. The user pivots the upper linkage member to a selected angle relative to the central linkage member and fixes the upper linkage member at the desired angle to selectively fix the height and angle of the nozzles on the spray boom relative to a target surface.

Further forms, objects, features, aspects, benefits, advantages, and embodiments of the present invention will become apparent from a detailed description and drawings provided herewith.

DESCRIPTION OF SELECTED EMBODIMENTS

Figure 1:
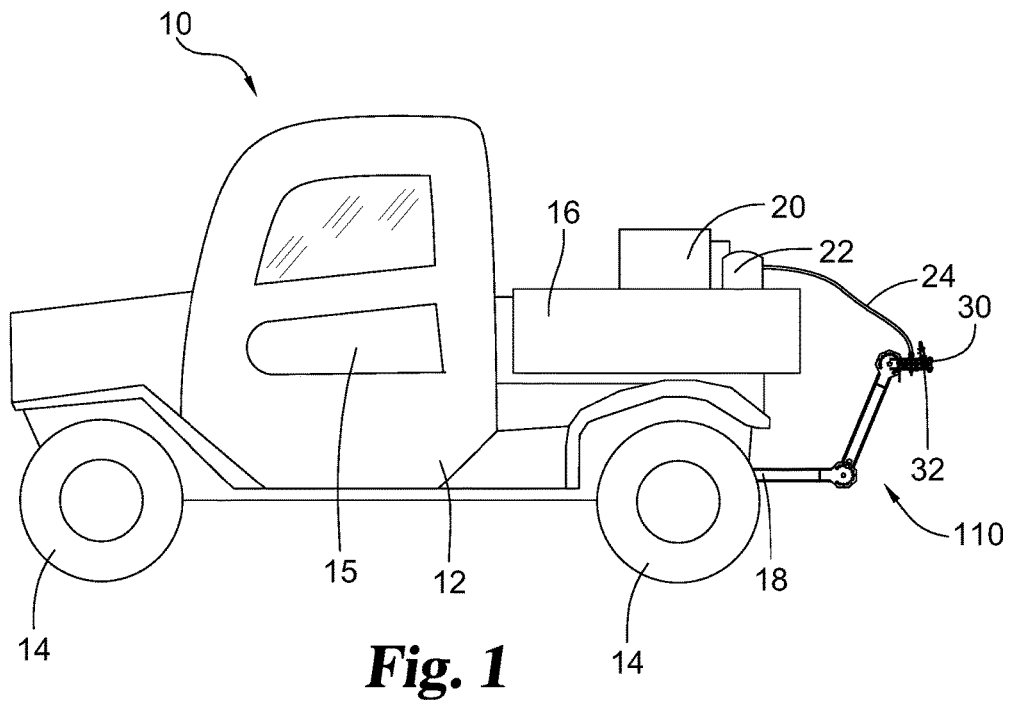
FIG. 1 is a perspective view of one embodiment of a vehicle with a support for a spray boom according an embodiment of the present disclosure.

For the purpose of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the invention as described herein are contemplated as would normally occur to one skilled in the art to which the invention relates. One embodiment of the disclosed device is shown in great detail; although it will be apparent to those skilled in the relevant art that some features that are not relevant to the present disclosure may not be shown for the sake of clarity.

Certain embodiments of the present invention provide a hitch mount and support for a spray boom. The support arrangement is configured to be mounted to a trailer hitch of a primary support vehicle, for instance on a lawn and garden tractor, on an all terrain vehicle ("ATV") or on a utility vehicle ("UTV"). Alternately, the support arrangement can be mounted to other types of vehicles or a secondary vehicle such as a towed trailer. The arrangement supports a boom with nozzles which can be used to dispense liquid onto the lawn, garden or other target surface. Lawn/garden liquids for use with the disclosed device and methods include, but are not limited to: water, pesticides, herbicides, fertilizers, and growth regulators. Other types of sprayable liquids may be used in other circumstances, such as deicing liquids or paints. The hitch mount and support is arranged in an adjustable "Z" arrangement. The support can be adjusted to selectively fix the height and angle of the nozzles on the spray boom relative to the target surface.

Referring generally to FIG. 1 there is shown a representative support vehicle 10 with an embodiment of support 110. Spray boom 30 is carried on support 110. The vehicle is typically driven in a forward direction and support 110 is mounted to the rear of the vehicle. Directional references herein are for ease of illustration and are not limiting. A typical support vehicle 10 includes at least a frame 12, four wheels 14 or tracks, an operator position 15 often with a seat which may be in a cab or cage, and a support area 16. Support area 16 may be an area suitable for cargo or it may be a mounting or carrying location such as a deck for various equipment and/or tools. A spray system 20 is typically carried with and adjacent to spray boom 30. In the illustrated embodiments, spray system 20 is arranged on and carried by the support area 16.

Spray system 20 includes a fluid reservoir such as tank 22 in which the liquid to be dispensed is initially loaded and stored. During use, the liquid is drawn from tank 22 and fed via hose 24 to a spray boom 30. Spray boom 30 typically has at least one nozzle 32 and preferably a plurality of nozzles 32 through which the liquid is dispensed during use. The nozzles 32 are typically arranged in a fixed position on boom 30 and are not directionally adjustable relative to the boom. The nozzles 32 may atomize the liquid and/or may dispense it in a stream. The spray pattern of the nozzles may be adjustable, for instance by changing the orifice size or orientation.

Spray system 20 will typically have a control apparatus and pump which applies suction/pressure to draw the liquid from tank 22 and then feed the liquid to hose 24 under pressure. In turn, hose 24 supplies the liquid under pressure to boom 30 and nozzles 32. The control apparatus may include one or more features such as switches, a manifold, valves, a pressure regulator and/or various indicators such as pressure level and/or fluid level indicators. Spray system 20 may be powered by the support vehicle or may have an independent power supply.

Figure 2:
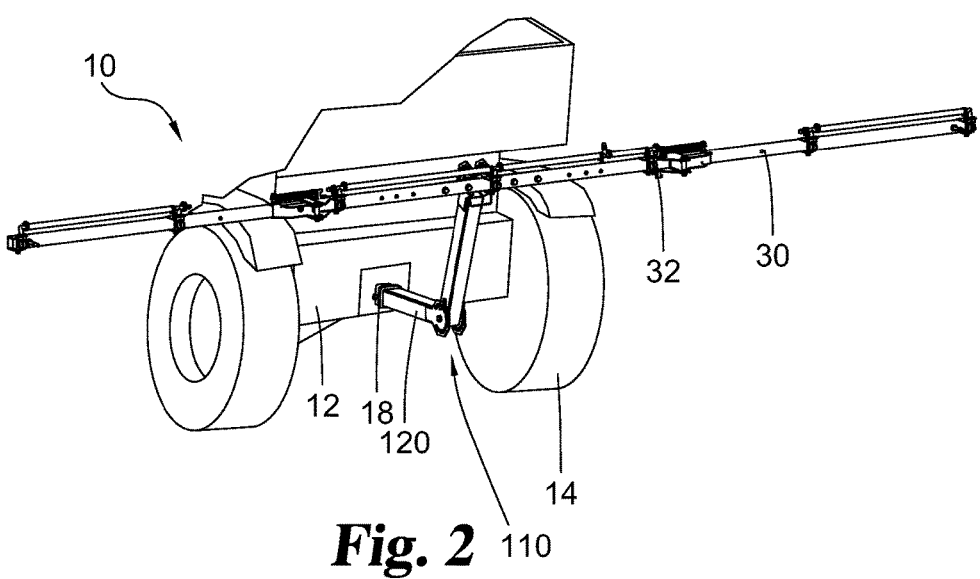
FIG. 2 is a partial rear view of the vehicle and support embodiment illustrated in FIG. 1.
Figure 3:
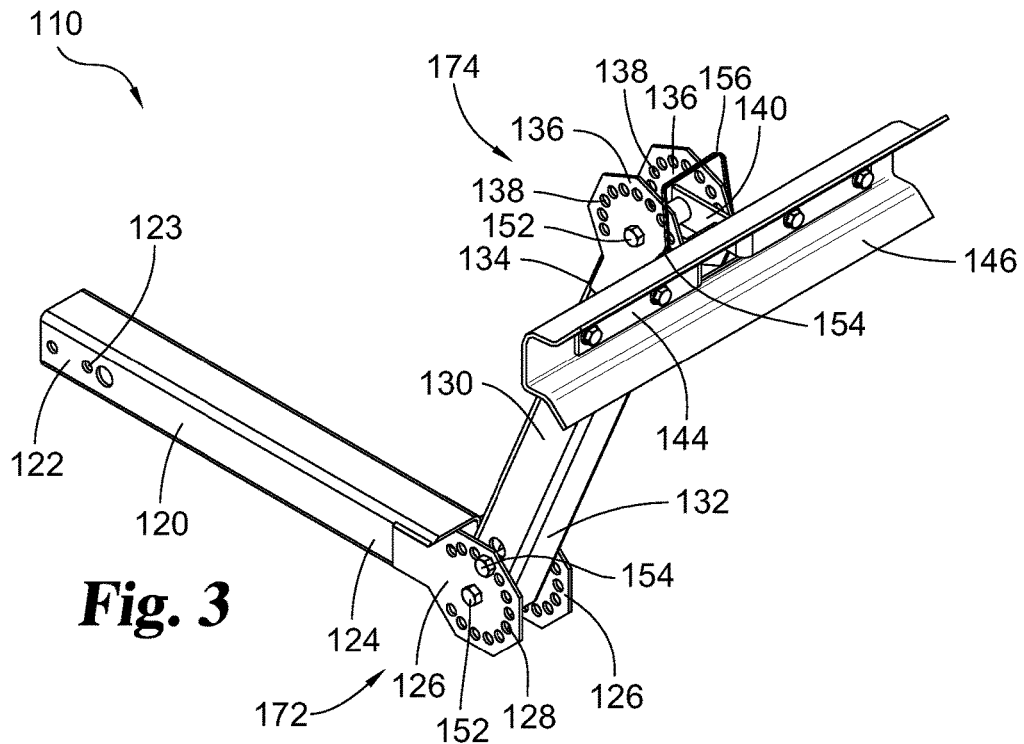
FIG. 3 is a perspective view of the support illustrated in FIG. 1.
Figure 4:
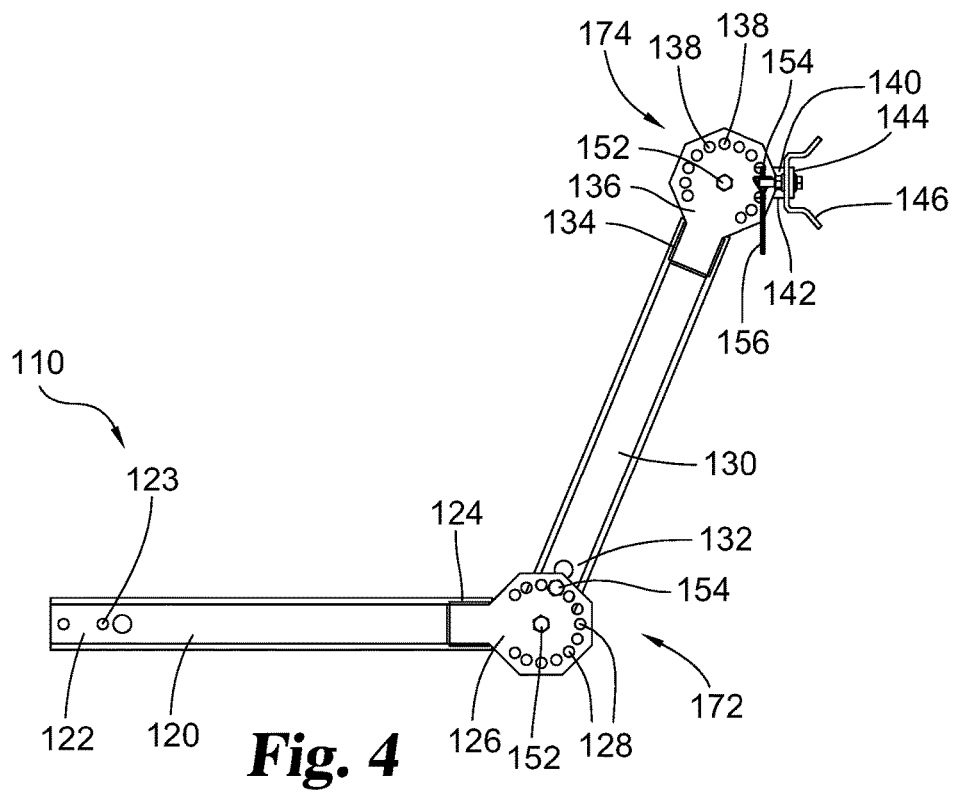
FIG. 4 is a side view of the support illustrated in FIG. 1.

Illustrated in FIG. 2 is a partial rear view of support vehicle 10. In the illustrated embodiment, support vehicle 10 includes a hitch mount 18 at the rearward end of frame 12. Support 110 is configured to couple with hitch mount 18, so that hitch mount 18 braces and holds support 110. In the illustrated embodiment, hitch mount 18 is formed with a rearward extending hollow tubular pipe portion defining an interior passage with a square cross-section. In other embodiments, other mount types and/or cross-sectional shapes may be used. A lower linkage member 120 of support 110 is arranged by sliding a forward end 122 into the interior channel defined by hitch mount 18. Preferably the cross-sections match in size and shape so that the cross-section of lower linkage member 120 is nested within the cross-section of hitch mount 18, and hitch mount 18 prevents linkage member 120 from moving vertically, laterally or rotationally. In an alternate embodiment, the cross-section of hitch mount 18 may match and fit within a passage in lower linkage member 120.

The forward end 122 is secured so that is it held from sliding out of the hitch mount. For instance, a cross-pin can be arranged through a lateral passage 123 defined in forward end 122 which is aligned with a corresponding lateral holes in hitch mount 18. The cross-pin can be selectively locked in place, for example using a cotter pin or wire ring transversely through the cross-pin. Alternate cross-pin embodiments may use a bolt and nut or similar fasteners which can be selectively locked in place. In alternate embodiments, lower linkage member 120 can be secured in a fixed orientation via other manners to a primary or secondary vehicle, for example using brackets or clamps. In still other embodiments, lower linkage member 120 can be permanently secured to frame 12, for example by welding.

The central portion of lower linkage member 120 may be formed as a tubular member with a square cross-section. Lower linkage member 120 extends to rearward end 124. Rearward end 124 includes a pair of lower joint plates 126. In certain embodiments, only one lower joint plate 126 is used. In certain embodiments, lower joint plates 126 are fastened to the central portion of lower linkage member 120 in a permanent manner such as welding or in a semi-permanent manner such as using fasteners. Alternately, lower joint plates 126 may be integrally formed with the central portion of the lower linkage member. Lower joint plates 126 are parallel and are planar in a substantially vertical orientation. Lower joint plates 126 are spaced apart to define a gap between them. The extending portions of lower joint plates 126 are wider than the central portion of lower linkage member 120 and predominantly radial, for instance having a substantially circular perimeter or defined by a polygon approaching and approximating a circular perimeter. In the illustrated embodiment, the lower joint plates incorporate an octagonal shape. One side includes an extension which is mounted to the tubular member and the seven remaining sides span an approximately 265 degree arc.

A transverse passage 127 for an axle 152 for lower joint 172 is defined through a geometric center of lower joint plates 126. Lower joint plates 126 each define a series of openings 128 adjacent the respective perimeters. Openings 128 are arranged in a circular pattern with a common radius extending from the axle passage. Openings 128 in each lower joint plate span an approximately 265 degree arc. The openings 128 of the two lower joint plates are arranged in aligned pairs.

The central portion of central linkage member 130 may be formed as a tubular member with a square cross-section. Central linkage member 130 extends upward from the rearward end of lower linkage member 120. As illustrated, lower end 132 of central linkage member forms a pivotal adjustable lower joint 172 with rearward end 124 of lower linkage member 120. In more detail, lower end 132 is arranged in the gap between joint plates 126. An axial passage 135 is defined in lower end 132. The axial passage 135 is aligned with the axial passage 127 in the lower linkage member. Axle 152 extends through the aligned axial passages and defines a pivot axis for the joint. An adjustment passage 133 is further defined in lower end 132. Adjustment passage 133 is spaced from axial passage 135 by a distance equal to the radius of openings 128 from axle passage 127.

As central linkage member 130 is pivoted, adjustment passage 133 can selectively be aligned with different openings 128. When desired, a cross-pin 154 can be placed through a selected opening 128 on one joint plate 126, through the aligned adjustment passage 133 in the central linkage member and then through the paired opening 128 in the opposing joint plate 126. Cross-pin 154 can be locked in place, for example using a cotter pin. Alternate lower joint embodiments may use a bolt and nut, a geared surface lock joint or similar fasteners or joints which can be selectively locked in place. Based on the opening 128 selected, the cross-pin secures central linkage member 130 at a selected angle relative to lower linkage member 120.

Central linkage member 130 extends to upward end 134. Upward end 134 includes a pair of outward extending upper joint plates 136. In alternate embodiment only one joint plate may be used. Upper joint plates 136 are parallel and are planar in a vertical orientation. Upper joint plates 136 are spaced apart to define a gap between them. The extending portions of upper joint plates 136 are predominantly radial, for instance having a substantially circular perimeter or formed as a polygon approaching and approximating a circular perimeter. In the illustrated embodiment, the upper joint plates incorporate an octagonal shape. One side includes an extension which is mounted to the tubular member and the seven remaining sides span an approximately 265 degree arc.

A transverse passage 137 for axle 152 for upper joint 174 is defined through a geometric center of upper joint plates 136. Each upper joint plate 136 further define a series of openings 138 adjacent the respective perimeters. Openings 138 are arranged in a circular pattern with a common radius extending from the respective axle passage. As illustrated, openings 138 span an arc of approximately 265 degrees.

Figure 5:
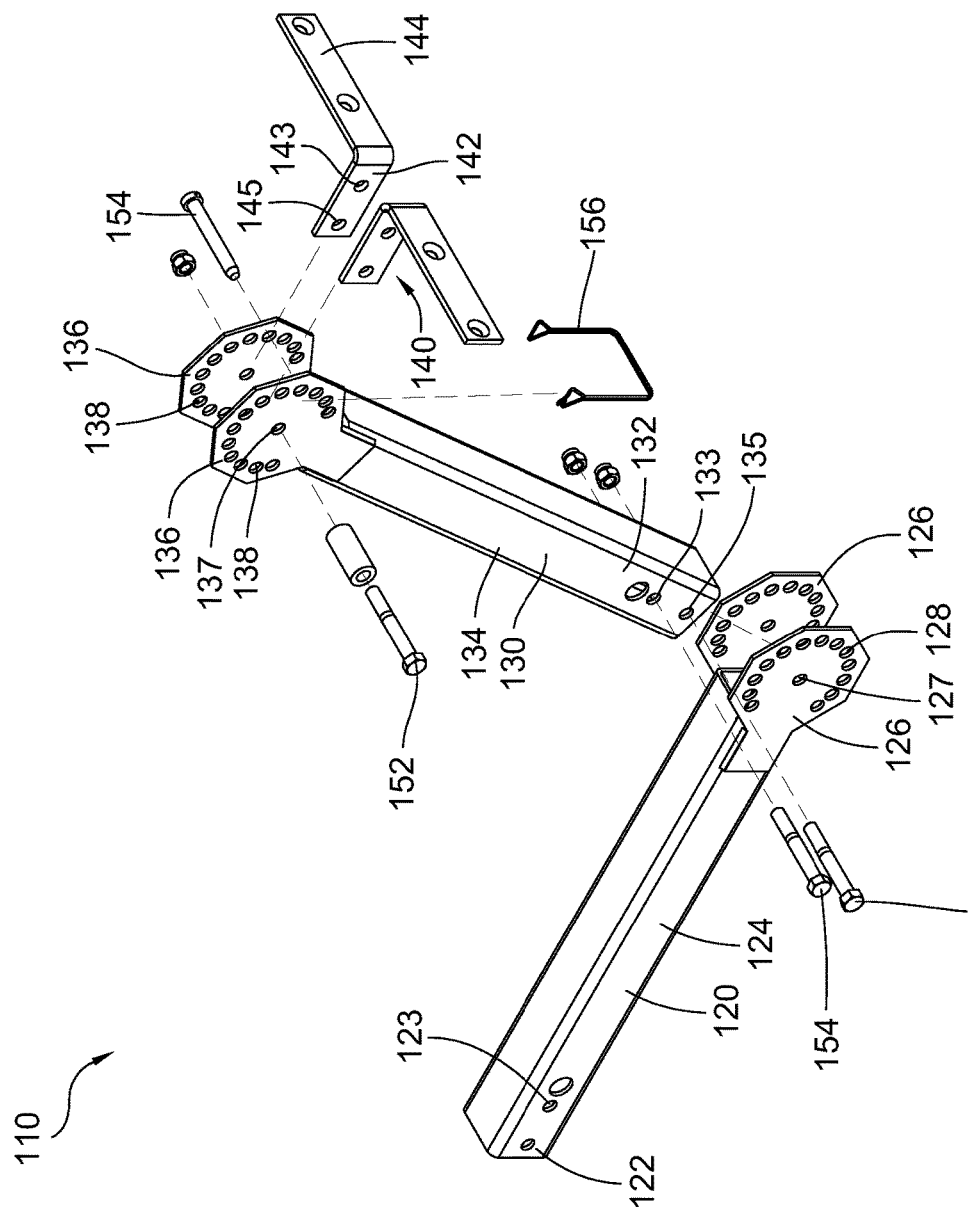
FIG. 5 is an exploded view of the support illustrated in FIG. 1.

Upper linkage member 140 extends rearward from the upper end 134 of central linkage member 130. In FIG. 5, linkage member 140 illustrated as a pair of L-shaped brackets. As illustrated, forward end 142 of upper linkage member 140 forms a pivotally adjustable upper joint 174 with the upper end of central linkage member 130. In more detail, forward end 142 is arranged in the gap between upper joint plates 136. An axial passage 145 is defined in forward end 142. The axial passage 145 is aligned with the axial passage 137 in upper joint plates 136. Axle 152 extends through the aligned axial passages and a spacer piece, and defines a pivot axis for upper joint 174. An adjustment passage 143 is further defined in forward end 142. Adjustment passage 143 is spaced from axial passage 145 by a distance equal to the radius of openings 138 from axial passage 137.

As upper linkage member 140 is pivoted, adjustment passage 143 can selectively be aligned with different openings 138. When desired, a cross-pin 154 can be placed through a selected opening 138 on one joint plate 136, through the aligned adjustment passage 143 in the upper linkage member and then through a paired opening 138 in the opposing joint plate 136. Cross-pin 154 can be a cotter pin which is locked in place, for example using a clip 156. Alternate cross-pin embodiments may use a bolt and nut or similar fasteners which can be selectively locked in place. Based on the opening 138 selected, the cross-pin secures upper linkage member 140 at a selected angle relative to central linkage member 130.

The rearward end 144 of upper linkage 140 supports spray boom 30. Rearward end 144 may incorporate appropriate fastening portions such as mounting bracket 146. The spray boom 30 can be fastened to mounting bracket 146 in a fixed orientation.

The lower, central and upper linkage members of support 110 form an adjustable "Z" arrangement. During the set-up stage, support 110 can be selectively adjusted by the operator to selectively fix the height and angle of the nozzles on the spray boom relative to the vehicle and the target surface. In the mounting step, lower linkage member 120 is inserted into hitch 18 and secured in place to couple support 110 to vehicle 10. Lower linkage member 120 generally stays substantially parallel to the target surface. The operator can then adjust the lower adjustable joint 172 to fix central linkage member 130 at a selected angle relative to lower linkage member 120. The operator may then adjust the upper adjustable joint 174 to fix upper linkage member 140 at a selected angle relative to central linkage member 130. Spray boom 30 may be secured to upper linkage member 140 before or after support 110 is mounted to vehicle 10. By choosing specific angles for both adjustment joints, the operator can control the height and angle at which support 110 holds sprayer boom 30. Correspondingly, this controls the height and angle at which nozzles 32 extend from sprayer boom 30 relative to the target surface. The user may then operate vehicle 10 and spray system 20 to dispense the lawn/garden liquid at the desired height and angle relative to the target surface.

Figure 6:
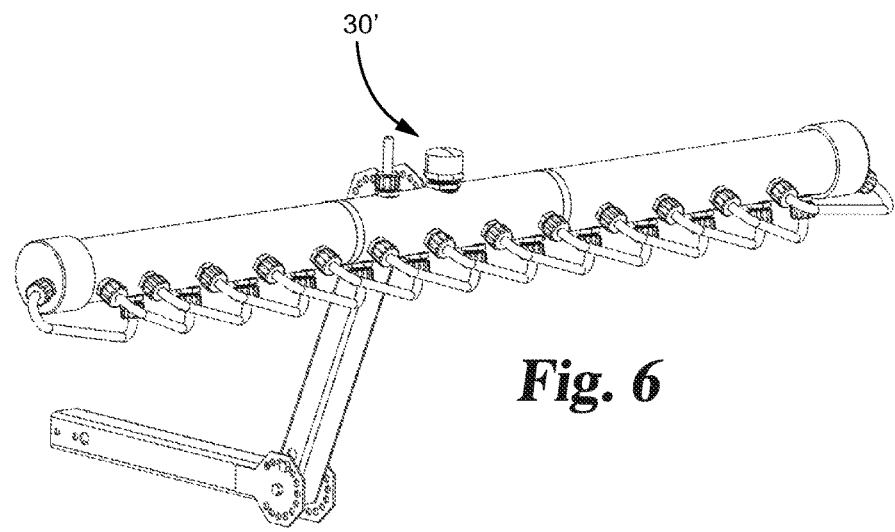
FIG. 6 shows an alternate embodiment of a sprayer boom usable with the support embodiment illustrated in FIG. 1.
Figure 7:
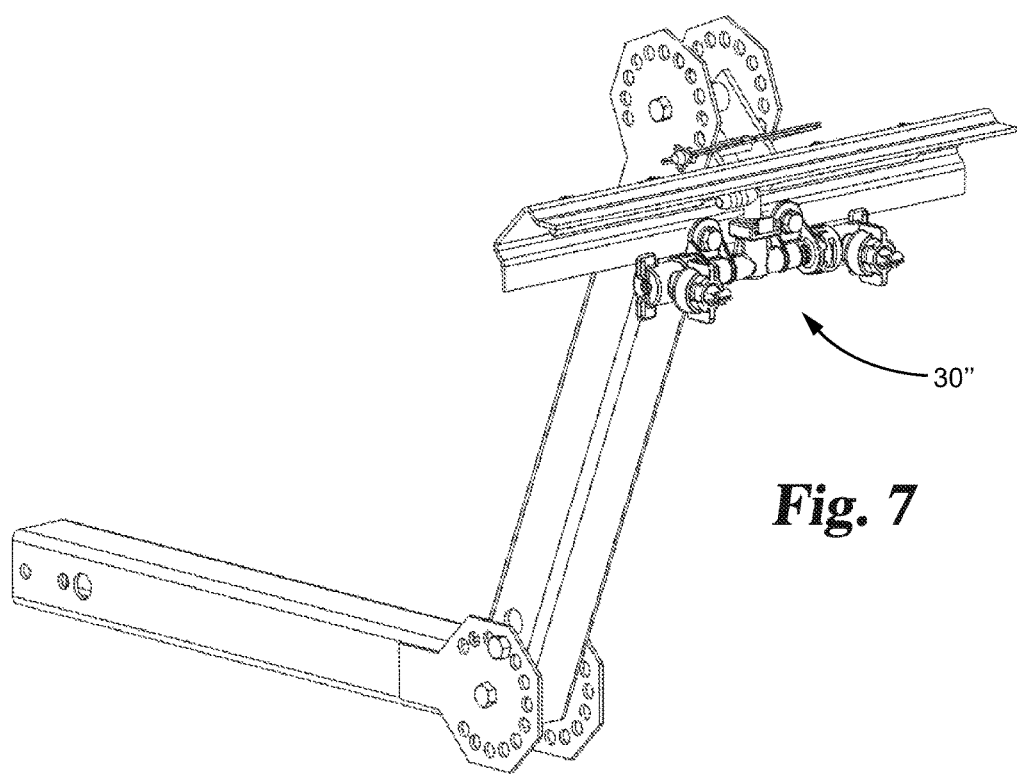
FIG. 7 shows a further embodiment of a sprayer usable with the support embodiment illustrated in FIG. 1.

FIG. 6 shows an alternate embodiment of a sprayer boom 30' usable with support 110. FIG. 7 shows a further embodiment of a short of boomless sprayer 30" usable with support 110.

While the disclosed device has been illustrated and described in detail in the drawings and foregoing description, the same is to be considered as illustrative and not restrictive in character, it being understood that only the preferred embodiment has been shown and described and that all changes, equivalents, and modifications that come within the spirit of the disclosure defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A lawn/garden liquid spraying device comprising:
    a lower linkage member having a forward end and an opposing rearward end, with the forward end coupled to a vehicle;
    a central linkage member having a lower end and an opposing upward end, wherein the lower end is pivotally coupled to the rearward end of the lower linkage member forming an adjustable lower pivot joint;
    wherein the lower pivot joint is selectively lockable to fix the central linkage member at an angle relative to the lower linkage member;
    a upper linkage member having a forward end and an opposing rearward end, with the forward end pivotally coupled to the upward end of the central linkage member forming an adjustable upper pivot joint;
    wherein the upper pivot joint is selectively lockable to fix the upper linkage member at an angle relative to the central linkage member;
    a spray boom with nozzles mounted to the rearward end of the upper linkage member; and,
    a fluid reservoir carried by the vehicle, wherein fluid in the reservoir is supplied under pressure to the spray boom and nozzles.

2. The spraying device of claim 1, wherein the vehicle comprises a hitch mount and the forward end of the lower linkage member is coupled to the hitch mount.

3. The spraying device of claim 2, wherein the hitch mount comprises a tubular portion and wherein the forward end of the lower linkage member comprises a tubular portion, wherein the tubular portions have matching cross-sectional shapes and wherein one tubular portion is sized to be fittingly received within an interior passage defined by the other tubular portion.

4. The spraying device of claim 3, wherein the forward end of the lower linkage member comprises a square cross-sectional tubular portion sized to be fittingly received within a square cross-sectional interior passage defined in the hitch mount.

5. The spraying device of claim 1, wherein the rearward end of the lower linkage member comprises at pair of parallel lower joint plates arranged in a vertical orientation and defining a gap between them, and wherein the lower end of the central linkage member is arranged in the gap between the lower joint plates with a lower joint axle extending through the lower joint plates and an axial passage in the central linkage portion.

6. The spraying device of claim 5, wherein each lower joint plate defines a series of openings arranged in a circular pattern with a common radius extending from the lower joint axle, wherein the central linkage member defines an adjustment passage spaced from the lower joint axle by a distance equal to the radius of the openings from the lower joint axle, and wherein as the central linkage member is pivoted the adjustment passage can selectively be aligned with different openings in the joint plates.

7. The spraying device of claim 6, comprising a cross-pin placed through a selected opening on one joint plate, through the aligned adjustment passage in the central linkage member and through the paired opening in the opposing joint plate to secure the central linkage member at a selected angle relative to the lower linkage member.

8. The spraying device of claim 5, wherein the upward end of the central linkage member comprises at pair of parallel upper joint plates arranged in a vertical orientation and defining a gap between them, and wherein the forward end of the upper linkage member is arranged in the gap between the upper joint plates with an upper joint axle extending through the upper joint plates and an upper joint passage in the upper linkage portion.

9. The spraying device of claim 8, wherein each upper joint plate defines a series of openings arranged in a circular pattern with a common radius extending from the upper joint axle, wherein the upper linkage member defines an adjustment passage spaced from the upper joint axle by a distance equal to the radius of the openings from the upper joint axle, and wherein as the upper linkage member is pivoted the adjustment passage can selectively be aligned with different openings in the upper joint plates.

10. The spraying device of claim 9, comprising a cross-pin placed through a selected opening on one upper joint plate, through the aligned adjustment passage in the upper linkage member and through the paired opening in the opposing upper joint plate to secure the upper linkage member at a selected angle relative to the central linkage member.

11. A lawn/garden liquid spraying device comprising:
  a lower linkage member having a forward end and an opposing rearward end, with the forward end configured to be coupled to a vehicle and wherein the rearward end includes a pair of parallel lower joint plates arranged in a vertical orientation and defining a gap between them;
  a central linkage member having a lower end and an opposing upward end, wherein the lower end is pivotally coupled between the lower joint plates forming a lower pivot joint and wherein the upward end includes a pair of parallel upper joint plates arranged in a vertical orientation and defining a gap between them;
  wherein the lower pivot joint is selectively lockable to fix the central linkage member at an angle relative to the lower linkage member;
  an upper linkage member having a forward end and an opposing rearward end, wherein the forward end is coupled between the upper joint plates forming an upper pivot joint;
  wherein the upper pivot joint is selectively lockable to fix the upper linkage member at an angle relative to the central linkage member; and,
  a spray boom with nozzles mounted to the rearward end of the upper linkage member.

12. The spraying device of claim 11, wherein each lower joint plate defines a series of openings arranged in a circular pattern with a common radius extending from a lower joint axle, wherein the central linkage member defines an adjustment passage spaced from the lower joint axle by a distance equal to the radius of the openings from the axle, and wherein as the central linkage member is pivoted the adjustment passage can selectively be aligned with different openings in the lower joint plates.

13. The spraying device of claim 12, comprising a lower cross-pin placed through the selected opening on one lower joint plate, through the aligned adjustment passage in the central linkage member and through a paired opening in the opposing lower joint plate to secure the central linkage member at a selected angle relative to the lower linkage member.

14. The spraying device of claim 12, wherein each upper joint plate defines a series of openings arranged in a circular pattern with a common radius extending from an upper joint axle, wherein the upper linkage member defines an adjustment passage spaced from the axle by a distance equal to the radius of the openings from the upper joint axle, and wherein as the upper linkage member is pivoted the adjustment passage can selectively be aligned with different openings in the upper joint plates.

15. The spraying device of claim 14, comprising an upper cross-pin placed through a selected opening on one upper joint plate, through the aligned adjustment passage in the upper linkage member and through the paired opening in the opposing upper joint plate to secure the upper linkage member at a selected angle relative to the central linkage member.

16. The spraying device of claim 14, wherein the series of openings in the lower joint plates span an arc of approximately 265 degrees and wherein the series of openings in the upper joint plates span an arc of approximately 265 degrees.

17. A method of using a lawn/garden liquid spraying device to a vehicle, comprising:
  coupling a support for a spraying device onto a vehicle, wherein the support includes a lower linkage having a rearward end pivotally coupled to a lower end of a central linkage member, and a rearward end of an upper linkage member pivotally coupled to an upper end of the central linkage member;
  mounting a spray boom with nozzles to the rearward end of the upper linkage member;
  pivoting the central linkage member to a selected angle relative to the lower linkage member and fixing the central linkage member at the selected angle; and, pivoting the upper linkage member to a selected angle relative to the central linkage member and fixing the upper linkage member at the selected angle to fix the height and angle of the nozzles on the spray boom relative to a target surface.

18. The method of claim 17 comprising supplying a lawn/garden liquid under pressure to the spray boom and nozzle from a reservoir carried with the vehicle.

19. The method of claim 17, wherein coupling the support comprises inserting a tubular portion of the lower linkage member into an interior passage defined by a tubular portion of a hitch mount, wherein the tubular portions have matching cross-sectional shapes.

20. The method of claim 19, wherein the forward end of the lower linkage member comprises a square cross-sectional tubular portion sized to be fittingly received within a square cross-shaped interior passage defined in the hitch mount.

* * * * *